US011533640B2

(12) United States Patent
Winslow et al.

(10) Patent No.: US 11,533,640 B2
(45) Date of Patent: Dec. 20, 2022

(54) MACHINE LEARNING-ASSISTED USE CASE CLASSIFICATION AND ADAPTIVE ANTENNA TUNING

(71) Applicant: QUALCOMM Incorporated, San Diego, CA (US)

(72) Inventors: David Loweth Winslow, San Diego, CA (US); Diego Calzolari, San Diego, CA (US); Peyman Hesami, Los Angeles, CA (US)

(73) Assignee: QUALCOMM Incorporated, San Diego, CA (US)

( * ) Notice: Subject to any disclaimer, the term of this patent is extended or adjusted under 35 U.S.C. 154(b) by 392 days.

(21) Appl. No.: 16/671,721

(22) Filed: Nov. 1, 2019

(65) Prior Publication Data

US 2021/0136601 A1 May 6, 2021

(51) Int. Cl.
*H04W 4/00* (2018.01)
*H04W 24/02* (2009.01)
*G06N 20/00* (2019.01)
*G06K 9/62* (2022.01)
*G06N 3/08* (2006.01)
*H04W 24/06* (2009.01)

(52) U.S. Cl.
CPC .......... *H04W 24/02* (2013.01); *G06K 9/6269* (2013.01); *G06N 3/08* (2013.01); *G06N 20/00* (2019.01); *H04W 24/06* (2013.01)

(58) Field of Classification Search
CPC .... H04W 24/02; H04W 24/06; G06K 9/6269; G06K 9/6256; G06N 3/08; G06N 20/00; H04B 17/103; H04B 1/0458
See application file for complete search history.

(56) References Cited

U.S. PATENT DOCUMENTS 6,414,562 B1 * 7/2002 Bouisse ................... H03H 7/40
                                                              333/17.3
8,232,925 B2 * 7/2012 Knudsen .................. H04B 1/40
                                                               343/702

(Continued)

FOREIGN PATENT DOCUMENTS

WO         2015120001         8/2015

OTHER PUBLICATIONS

Weale et al., Closed-Loop Antenna Tuning: Why, What, Where, IEEE, 2 pages, 2016.*

(Continued)

*Primary Examiner* — Frank Duong
(74) *Attorney, Agent, or Firm* — Patterson & Sheridan, LLP

(57) ABSTRACT

Certain aspects of the present disclosure provide techniques for adaptively tuning a wireless data transmission system in an electronic device, including: generating a plurality of measurements of an element of the wireless data transmission system in the electronic device; generating a determined use case for the electronic device based on a use case determination model and the plurality of measurements; determining one or more antenna settings associated with the determined use case; tuning the wireless data transmission system based on the one or more antenna settings; and transmitting data via the wireless data transmission system using the one or more antenna settings.

35 Claims, 8 Drawing Sheets

(56) References Cited

U.S. PATENT DOCUMENTS

| | | | | |
|---|---|---|---|---|
| 8,542,157 | B2* | 9/2013 | Wu | H04B 1/0458 343/850 |
| 8,744,418 | B2* | 6/2014 | Novet | H04M 1/0202 455/414.1 |
| 8,866,561 | B2* | 10/2014 | van Bezooijen | H03H 7/38 333/17.3 |
| 9,444,425 | B2* | 9/2016 | Mow | H04B 17/29 |
| 9,595,994 | B2 | 3/2017 | Yan et al. | |
| 9,774,362 | B1 | 9/2017 | Sammeta et al. | |
| 10,530,064 | B2* | 1/2020 | Desclos | H01Q 5/335 |
| 10,693,516 | B2* | 6/2020 | Han | H04B 1/3838 |
| 2014/0066124 | A1* | 3/2014 | Novet | H04M 1/0202 455/556.1 |
| 2015/0044977 | A1* | 2/2015 | Ramasamy | H01Q 1/44 455/77 |
| 2015/0237183 | A1* | 8/2015 | Novet | H04M 1/72454 455/556.1 |
| 2017/0084989 | A1 | 3/2017 | Shi et al. | |
| 2018/0041184 | A1* | 2/2018 | Broyde | H04B 1/0458 |
| 2018/0048279 | A1* | 2/2018 | Broyde | H04B 1/18 |
| 2018/0367192 | A1 | 12/2018 | O'Shea et al. | |
| 2020/0146023 | A1* | 5/2020 | Kim | H04B 1/0458 |

OTHER PUBLICATIONS

International Search Report and Written Opinion—PCT/US2020/058397—ISA/EPO—dated Feb. 16, 2021.

Joung J: "Machine Learning-Based Antenna Selection in Wireless Communications", IEEE Communications Letters, IEEE Service Center, Piscataway, NJ, US, vol. 20, No. 11, Nov. 30, 2016 (Nov. 30, 2016), pp. 2241-2244, XP011633659, ISSN: 1089-7798, DOI: 10.1109/LCOMM.2016.2594776 [retrieved on Nov. 9. 2016], The Whole Document.

\* cited by examiner

MACHINE LEARNING-ASSISTED USE CASE CLASSIFICATION AND ADAPTIVE ANTENNA TUNING

INTRODUCTION

Aspects of the present disclosure relate to machine learning-assisted use case classification and adaptive antenna tuning.

Wireless devices, such as smartphones, may have multiple antennas for communicating wireless data. The way in which such devices are used, for example, how a smartphone is being held, can affect the performance of the antennas and thus the performance of the data wireless transmission. For example, degraded performance may lead to slow wireless data transmission, increased battery usage, and increased wireless network interference.

Accordingly, what are needed are systems and methods for adapting the usage of a mobile device's wireless transmission systems based on how a wireless electronic device is being used.

BRIEF SUMMARY

Certain aspects provide a method of generating an electronic device use case determination model for an electronic device, comprising: generating a plurality of test measurements of a wireless data transmission system in a first type of electronic device, wherein each test measurement of the plurality of test measurements is associated with a predefined use case of the first type of electronic device; and training a machine learning model based on the plurality of test measurements to determine a use case for the first type of electronic device based on a plurality of operational values of the first type of electronic device.

Further aspects provide a training system, comprising: a memory comprising computer-executable instructions; a processor configured to execute the computer-executable instructions and cause the training system to: generate a plurality of test measurements of a wireless data transmission system in a first type of electronic device, wherein each test measurement of the plurality of test measurements is associated with a predefined use case of the first type of electronic device; and train a machine learning model based on the plurality of test measurements to determine a use case for the first type of electronic device based on a plurality of operational values of the first type of electronic device.

Further aspects provide a method for adaptively tuning a wireless data transmission system in an electronic device, comprising: generating a plurality of measurements of an element of the wireless data transmission system in the electronic device; generating a determined use case for the electronic device based on a use case determination model and the plurality of measurements; determining one or more antenna settings associated with the determined use case; tuning the wireless data transmission system based on the one or more antenna settings; and transmitting data via the wireless data transmission system using the one or more antenna settings.

Further aspects provide an electronic device, comprising: a wireless data transmission system; a memory comprising computer-executable instructions; a processor configured to execute the computer-executable instructions and cause the electronic device to: generate a plurality of measurements of an element of the wireless data transmission system in the electronic device; generate a determined use case for the electronic device based on a use case determination model and the plurality of measurements; determine one or more antenna settings associated with the determined use case; tune the wireless data transmission system based on the one or more antenna settings; and transmit data via the wireless data transmission system using the one or more antenna settings.

The following description and the related drawings set forth in detail certain illustrative features of one or more aspects.

BRIEF DESCRIPTION OF THE DRAWINGS

The appended figures depict certain aspects of the one or more aspects and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1A:
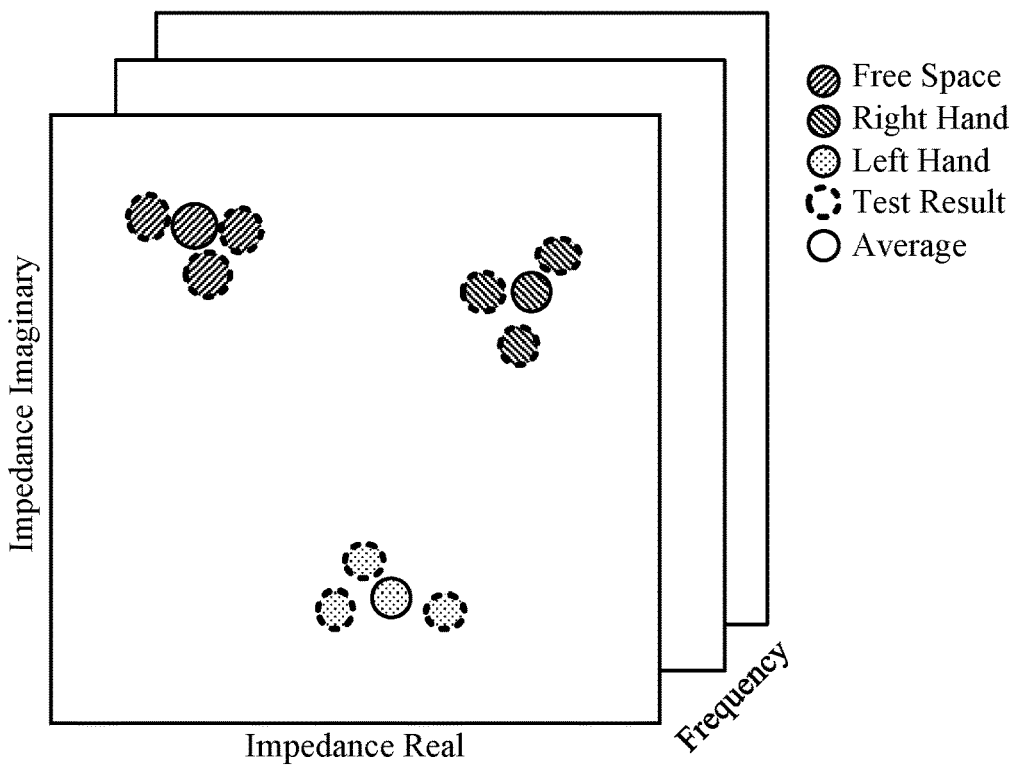
FIG. 1A depicts an example of test results for three different use cases of a wireless electronic device.

Aspects of the present disclosure provide apparatuses, methods, processing systems, and computer readable media for machine learning-assisted use case classification and adaptive antenna tuning.

As wireless electronic devices get smaller and more capable, the challenge of designing wireless data transmission systems gets more complicated at least in part due to the complexity of designing effective antennas within the tight and complex internal confines of such devices. In fact, because contemporary wireless electronic devices operate on many wireless frequencies at once for both transmission and reception, multiple antennas of different design are often necessary in a single device.

The functional design and packaging challenges are only one aspect of the overall challenge of creating effective wireless data transmission systems for wireless electronic devices. The different modes of usage or "use cases" of such devices poses another challenge because different use cases affect the performance of the wireless data transmission system(s) differently.

For example, holding a wireless electronic device, such as a smartphone or tablet computer, in a left hand versus a right hand, or with both hands, may change the wireless data transmission performance because the different hand placements affect different antennas differently. Thus, use cases, such as: left-handed usage, right-handed usage, placement on a surface (e.g., a lap of a user), placement within a confine (e.g., in a pocket, car, or plane), usage while plugged in (e.g., via a USB or similar cable), and the like all generally affect wireless data transmission performance differently. Notably, these are just a few example use cases and generally a use case for a wireless electronic device may be any identifiable manner in which the device is used.

The performance degradation caused by wireless electronic device different use cases may be mitigated and recovered in various ways.

For example, impedance matching and tuning may be performed dynamically to improve the performance of antennas in electronic devices. Generally, impedance is the opposition to the flow of energy through a system. Constant electronic signals may have constant impedance and varying electronic signals may have impedance that varies with changing frequency. Impedance generally has a complex value comprising a resistance component, which forms the "real" part of the value, and a reactance component, which forms the "imaginary" part of the value.

Antenna impedance relates to the voltage and current at the input to an antenna. The "real" part of the antenna impedance represents power that is either radiated away or absorbed within the antenna and the "imaginary" part of the impedance represents power that is stored in the near field of the antenna, i.e., non-radiated power. An antennas is generally more efficient and thus effective when impedance of the system is optimized for the antenna.

Impedance matching refers to designing the input impedance of an electrical load or the output impedance of its corresponding signal source to maximize the power transfer and minimize signal reflection from the load. Because, impedance varies with variable frequency signals, though, dynamic impedance tuning may be used to tune an antenna to match a radio frequency front-end (RFFE) so that power transfer from the RF front end to the antenna is maximized.

Impedance tuning may be performed in an "open-loop" configuration, where pre-determined parameters (e.g., for predetermined use cases) are used to tune the antenna to the system, or in a "closed-loop" configuration where parameters are adjusted dynamically to tune the antenna to the system. In both cases, parameters, whether predetermined or dynamically determined, may be matched to use cases in order to improve antenna performance (e.g., total radiated power and return loss) while a wireless electronic device is being used according to that use case.

Aperture tuning is another way to recover performance caused by different use cases of a wireless electronic device. Generally, antenna aperture tuning is a process of modifying the resonant frequency of an antenna to match a specific application or frequency. By tuning the resonant frequency of the antenna for a specific application or frequency, the efficiency of the antenna is improved for that specific application or at that specific frequency. Aperture tuning may thus allow the same antenna to be used for multiple applications at multiple frequencies.

On way to perform aperture tuning of an antenna is to modify the electrical length of the antenna to adjust its resonant frequency. In some aspects, a switch is used to adjust the resonant frequency of the antenna by connecting the antenna to ground paths of different lengths. A capacitor or inductor can also be used to further adjust the resonant frequency, to support different bands. They can be connected between the switch and the radiating element.

Beneficially, aperture tuning may have less loss than impedance tuning and may be capable of improving antenna efficiency even more than impedance tuning. The two methods are not mutually exclusive, though, and a combination of the two may yield better results than either by itself.

Aperture tuning may generally improve an antenna's performance, such as its band of operation, return loss, bandwidth, gain, and efficiency. In contemporary mobile devices, such as a smartphones, tablet computers smart wearables and the like, aperture tuning may beneficially improve the device's ability to operate in multiple bands at different times in what may be referred to as band-select tuning.

In some aspects, aperture tuning may be performed using one or more switches in parallel (e.g., a shunt-type switch) or in series between an antenna feed and an antenna. Each switch selectively connects an antenna to ground paths of different electrical length, thus shifting the antenna's resonance and thereby changing the performance of the antenna without any structural change to the antenna.

Adaptive aperture tuners may use various measurements to determine the best aperture settings for the antenna. For example, feedback reception measurements may be used to determine a current use case of a wireless electronic device.

Conventionally, a wireless electronic device may be tested in a number of different use cases to generate use case characterization data for a look-up table (or similar) that can subsequently be used for determining use cases while the device is in use.

For example, FIG. 1A depicts test results for three different use cases (free space, right hand, and left hand) as well as calculated averages for each of the sets of test results. The averaged points may be referred to as characteristic or representative points for a use case based on the test results. In this example, the test results measure real and imaginary impedance for a given frequency, and the tests may be performed over many different frequencies based on the capabilities of the wireless electronic device. Based on these measurement results, simple use case decision boundaries can be determined as depicted in FIG. 1B (as depicted by the arcs).

Figure 1B:
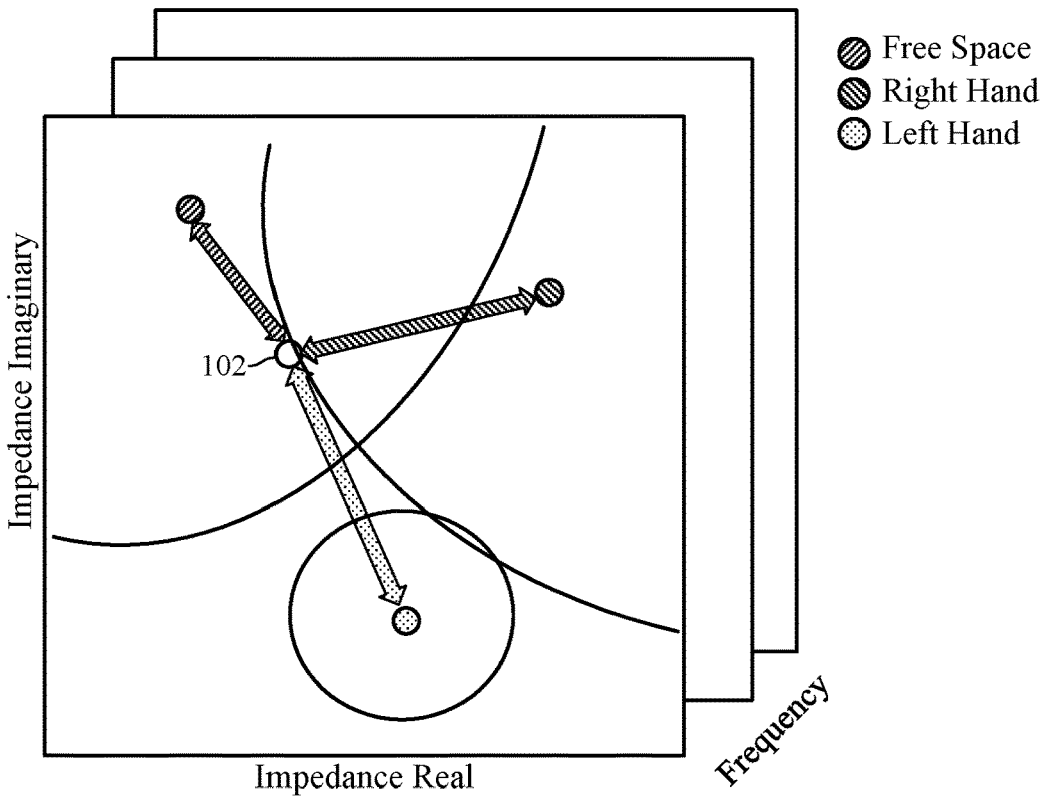
FIG. 1B depicts an example use cases decision boundaries for a wireless electronic device based on measured test results.

As further shown in FIG. 1B, a "live" measurement 102 may be plotted and compared against the representative points for different use cases and/or against the use case decision boundaries to determine how the wireless electronic device is currently being used (e.g., a current use case of the wireless electronic device).

Unfortunately, the initial modeling between measurements and use cases, such as shown in FIG. 1A is time-consuming, costly, and generally under-representative because it is impractical to test the myriad different ways any given device going into production may be used (e.g., with respect to various use cases). For example, a device may be tested in a few different positions to determine a few different use cases, but that testing will rarely be truly representative of the wide variety of different ways the device may be handled by various users. For example, as depicted in FIG. 1B, the decision boundaries cover a wide area around the representative points for each of the three example use cases, and those large areas may be over-representative of a particular use case.

Further as depicted in FIG. 1B, there are many areas where use case decision boundaries overlap such that a point might fall within the bounds of multiple use cases, leading to additional uncertainty in a use case determination. Consequently, using simple, overlapping decision boundaries and representative points as in this example may require additional processing by the wireless electronic device, which slows down operation and uses more power.

More generally, the limited nature of conventional testing leads to limited use case test data and models with limited ability to reliably determine how a device is currently being used (e.g., with respect to a defined set of use cases) case based on live data measurements. Notably, use case misdetermination or misprediction can cause the wrong antenna tuner settings to be applied and lead to suboptimal wireless data transmission performance of a device.

To improve upon conventional testing and use case determination, the systems and methods described herein implement trained machine learning models to determine use cases associated with how a device is being used based on measurement data. The machine learning models (e.g., neural network models) may be trained based on test measurement data as well as synthesized data to reduce data collection and testing requirements and to thereby simplify use case determination. Generally, a use case determination may be based on a continuous numerical output of a model or based on a categorical or discrete output of a model (such as a classification). In some aspects, use case determination may be referred to as a use case prediction.

Further, the trained machine learning models described herein may implement a filter or two-stage classifier to decide if it is necessary to make a new use case determination at any given point in time, which saves processing power in many cases where a new determination is not necessary.

Further yet, the trained machine learning models described herein may be configured to automatically ignore indistinguishable use cases, which avoids erroneous use case determinations based on conventional, over-inclusive decision boundaries, such as discussed with respect to FIG. 1B. Finally, the machine learning models described herein can be split by frequency and/or aperture tuner state to reduce their dimensionality, further reducing the processing power requirements.

Example System for Performing Adaptive Antenna Tuning

Figure 2:
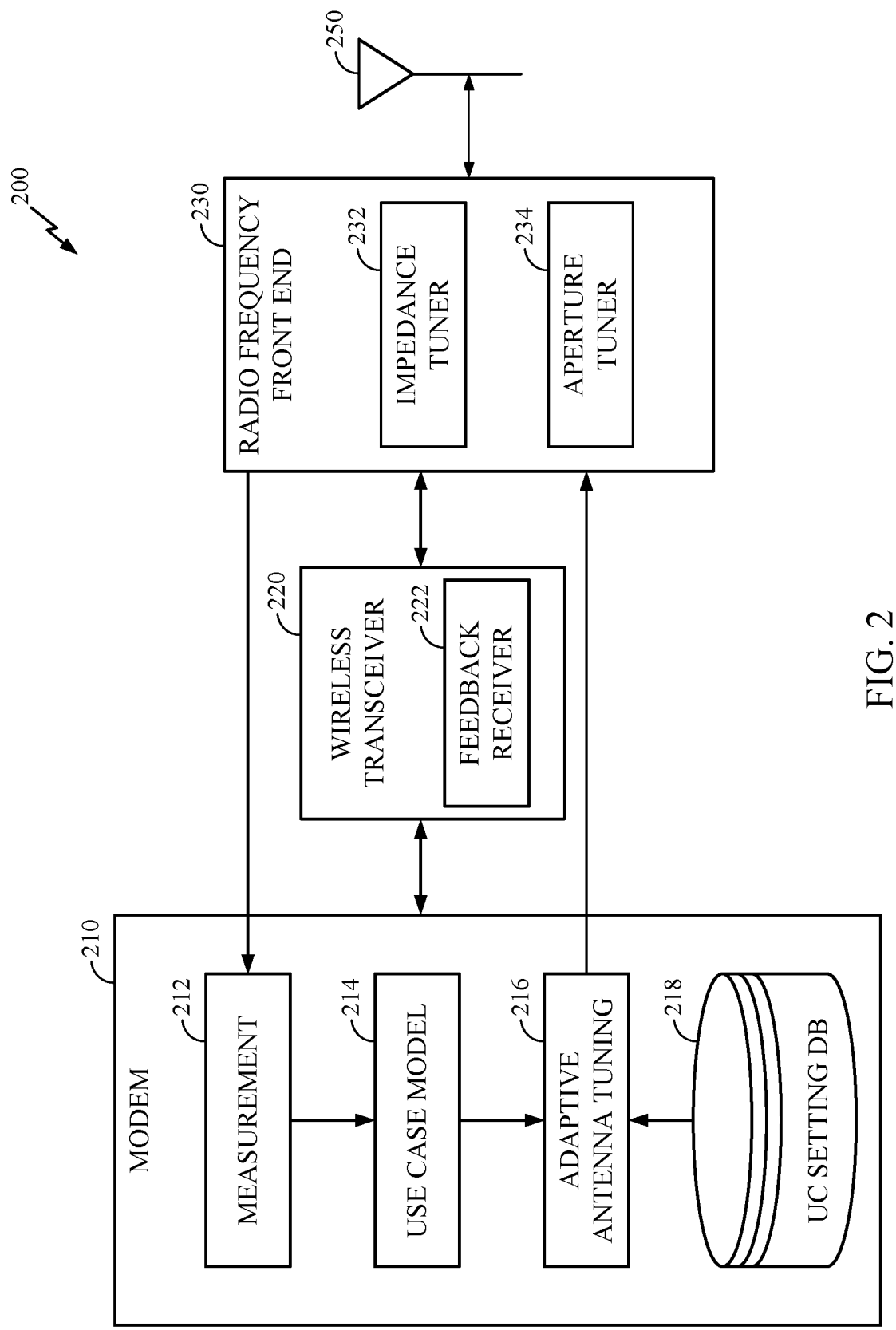
FIG. 2 depicts an example system for determining use cases and performing adaptive aperture tuning in a wireless electronic device.

FIG. 2 depicts an example system 200 for performing adaptive antenna tuning in a wireless electronic device.

System 200 includes a modem 210, which in this aspect includes a measurement component 212, use case determination model 214, adaptive antenna tuning component 216, and use case setting database 218.

Measurement component 212 may be configured to receive measurement data, such as impedance and frequency measurements, from other aspects of a wireless electronic device. For example, measurement component 212 may receive measurements from radio frequency front end 230 in one aspect.

Additionally or alternatively, measurement component 212 may receive measurement data from wireless transceiver 220. For example, in some aspects, wireless transceiver 220 may include a feedback receiver (FBRx), which is a circuit that compares a measurement of a transmitted signal at different points along the transmission chain. In such aspects, a voltage standing wave ratio (VSWR) may be determined, which provides a measurement of complex impedance of the transmit signal. Then, an aspect of modem 210, such as adaptive antenna tuning 216, may take the complex impedance and translates it to impedance at the antenna. As above, this antenna impedance may be used to determine how the antenna is affected by different device use cases. This process is similar to using a network analyzer to measure impedance and/or return loss of the antenna.

Use case determination model 214 may be configured to receive measurements via measurement component 212 and determine a use case for a wireless electronic device. An example of use case determination model 214 is described in more detail below with respect to FIG. 4.

Adaptive antenna tuning component 216 may receive a determined use case for the wireless electronic device from use case determination model 214 and retrieve associated use case settings from use case setting database 218 in order to determine one or more antenna tuning parameters, such as aperture and/or impedance tuning parameters. Adaptive antenna tuning component 216 is further configured to provide the tuning parameters to impedance tuner 232 and aperture tuner 234 in radio frequency front end 230 in order to improve the performance of antenna 250.

In order to transmit and receive data, modem 210 is connected to wireless transceiver 220, which is in-turn connected to a radio frequency front end (RFFE) 230, which is connected to antenna 250 (which may be representative of multiple antennas). Note that modem 210 may include many other aspects that are not depicted in this example for simplicity, such as: processing cores, read only memories (ROMs), random access memories (RAMs), security components, peripheral components, caches, and others.

In this aspect, radio frequency front end 230 includes an impedance tuner 232 and an aperture tuner 234, which are configured to perform impedance tuning and aperture tuning, respectively. Note that radio frequency front end 230 may include many other aspects that are not depicted in this example for simplicity, such as: a power amplifier, power tracker, duplexer, hexaplexer, switches, low noise amplifier, filter, antenna switches, and an extractor, to name a few.

Radio frequency front end 230 is further connected to antenna 250. Note that in this example, a single antenna 250 is depicted for simplicity, but radio frequency front end 230 may be connected to a plurality of antennas. Further, this example depicts a single radio frequency front end, but other aspects may include multiple radio frequency front ends, such as for different radio access technologies.

Implementing a system for performing adaptive antenna tuning using a machine-learning based use case determination model in a wireless electronic device, such as system 200, can significantly improve the performance of the electronic device's wireless data transmission system(s). For example, a 3-5 dB improvement in antenna efficiency may be achieved along with reduced power usage, increased battery life, and decreased network interference. Such improvements, while generally beneficial, may be particularly relevant to certain scenarios, such as usage indoor and/or at a cell edge, or when a wireless electronic device is handled in such a way that multiple antennas are covered.

Notably, FIG. 2 depicts only selected aspects of a wireless electronic device for simplicity, and many other aspects are possible, such as other processors, memories, sensors, input and output devices, peripheral systems, and the like.

Example Method for Generating Training Data for a Use Case Determination Model

Figure 3:
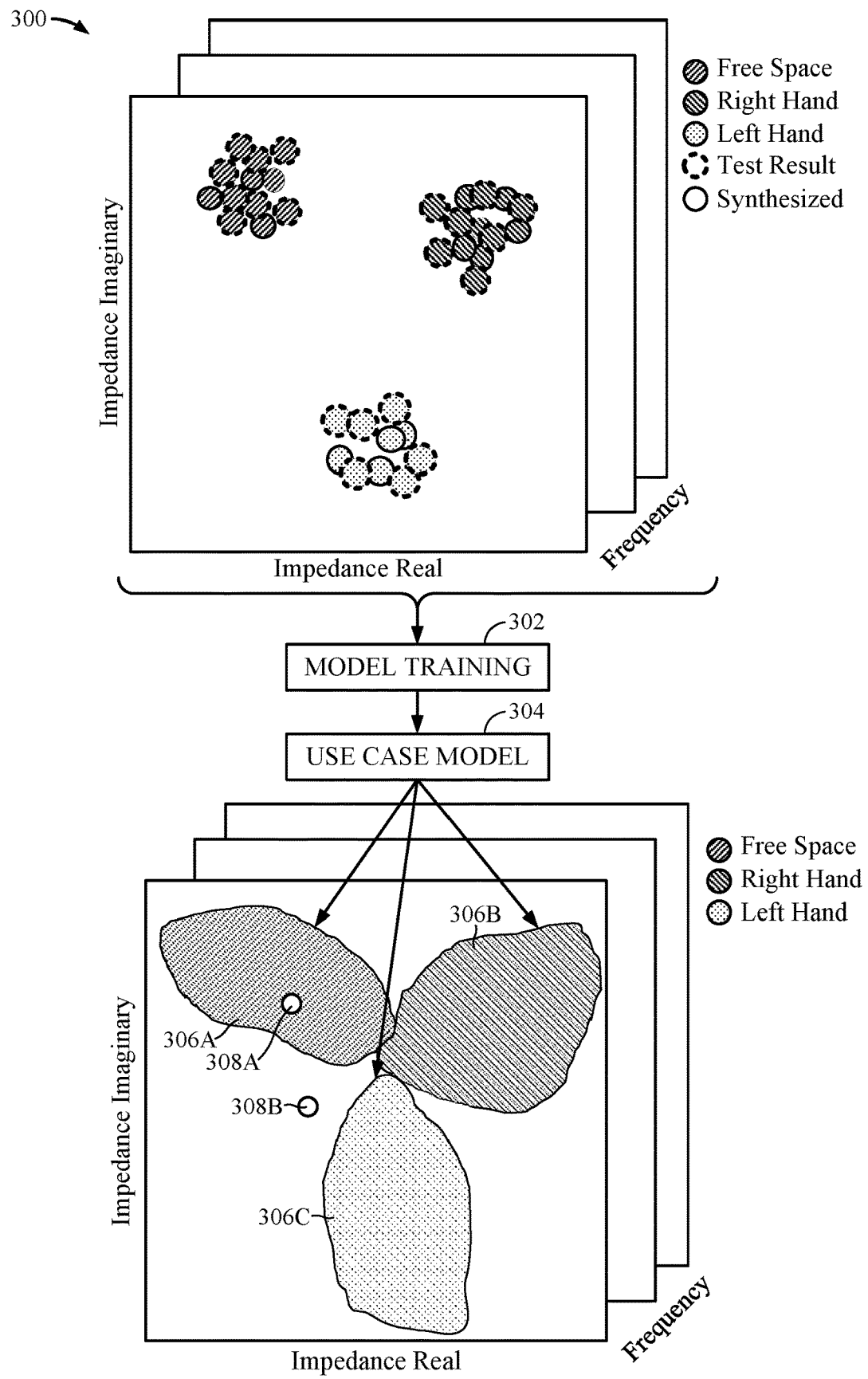
FIG. 3 depicts aspects of generating training data to train a use case determination model.

FIG. 3 depicts aspects of generating training data to train a use case determination model configured to determine how an electronic device is being used.

In particular, FIG. 3 depicts an example 300 of collecting test data associated with different use cases, which in this example include: free space, right-handed use, and left-handed use. In this example, as in the example in FIG. 1A, test data measurements include imaginary and real impedance for various frequencies. For example, the measurements may be made with respect to an antenna of a wireless electronic device.

In some aspects, such as depicted in FIG. 3 (and unlike in FIG. 1A), additional synthetic data points are generated based on statistical sampling of the test data points. For example, Synthetic Minority Over-Sampling Technique (SMOTE) and Kernel Density Estimation (KDE) may be used in aspects. However, any statistical method to oversample a distribution may be used. The synthesized data points improve the ability to train a machine learning model by increasing the number of labeled data points available for model training.

In some aspects, in addition to synthetic data points associated with a use case, additional synthetic data points may be generated, which are not associated with a use case. Such data points, which may be referred to as synthetic background data points, may improve use case decision boundary robustness during training of the use case determination model. These data points may be placed, for example, such that they maintain a minimum distance from any other test data point (including other synthetic background data points) so that the rest of the test area is populated with such points.

The test data points, and in this aspect the synthesized test data points, are used as labeled test data for model training 302. In this example, model training 302 may include supervised machine learning training techniques to train a machine learning-based use case determination model 304. In some aspects, use case determination model 304 is a neural network model. For example, use case determination model 304 may be an example of a use case determination model 214 as depicted in FIG. 2.

In some aspects, the complexity of model training step 302 may be reduced by splitting the training into training batches based on specific states (e.g., aperture tuner or impedance tuner states) as well as based on different frequencies. This sort of batched training can reduce the training time for models to minutes instead of hours or days.

After training, use case determination model 304 is configured to determine use cases based on live data, such as measurement data received at measurement component 212 in FIG. 2.

In one aspect, use case determination model 304 may be configured to determine use case decision boundaries for each use case, such as use case decision boundaries 306A-C. In some aspects, decision boundaries 306A-C may be determined by simulating measurements for the real and imaginary components of impedance (in this example) across a broad range of values and determining a boundary point wherein a probability for each use case is above a threshold, such as above a 95% probability. However, the threshold is tunable for different scenarios.

The decision boundaries 306A-C in FIG. 3 may be referred to as closed and complex decision boundaries because the boundaries enclose a specific area of measured values and because the boundary is not necessarily a fixed distance from a single "representative point", such as depicted in the example of FIG. 1B. Rather each decision boundary is complex based on the training of the use case determination model.

The complexity or "tightness" of the decision boundaries may be manipulated by changing the number of nodes in a neural network-based use case determination model. For example, generally increasing the number of nodes will tend to make tighter and more complex decision boundaries, while decreasing the number of nodes will make looser or simpler decision boundaries.

Live data, such as points 308A and 308B, may be plotted and compared to decision boundaries such as 306A-C in order to determine how a wireless electronic device is being used (e.g., with reference to use cases defined by the decision boundaries).

For example, because live data point 308A falls within decision boundary 306A, a "free space" use case may be determined for the wireless electronic device. By contrast, because live data point 308B falls outside of all of the characterized decision boundaries 306A-C, no current use case may be reliably determined. In such cases, the existing use case of the wireless electronic device may be maintained and the live data ignored because there is not a reliable determination of an alternate use case. Notably, this is in contrast to the simple decision boundaries depicted in FIG. 1B, in which a new use case would be determined more often based on the less well-defined use case decision boundaries.

In another example, a use case determination model may output probabilities corresponding to each of the use cases and select the highest probability that exceeds a probability threshold. In such examples, the cut-off threshold may be considered a filter for test data points that are not confidently any of the characterized use cases.

Example Use Case Determination Model Architecture

Figure 4:
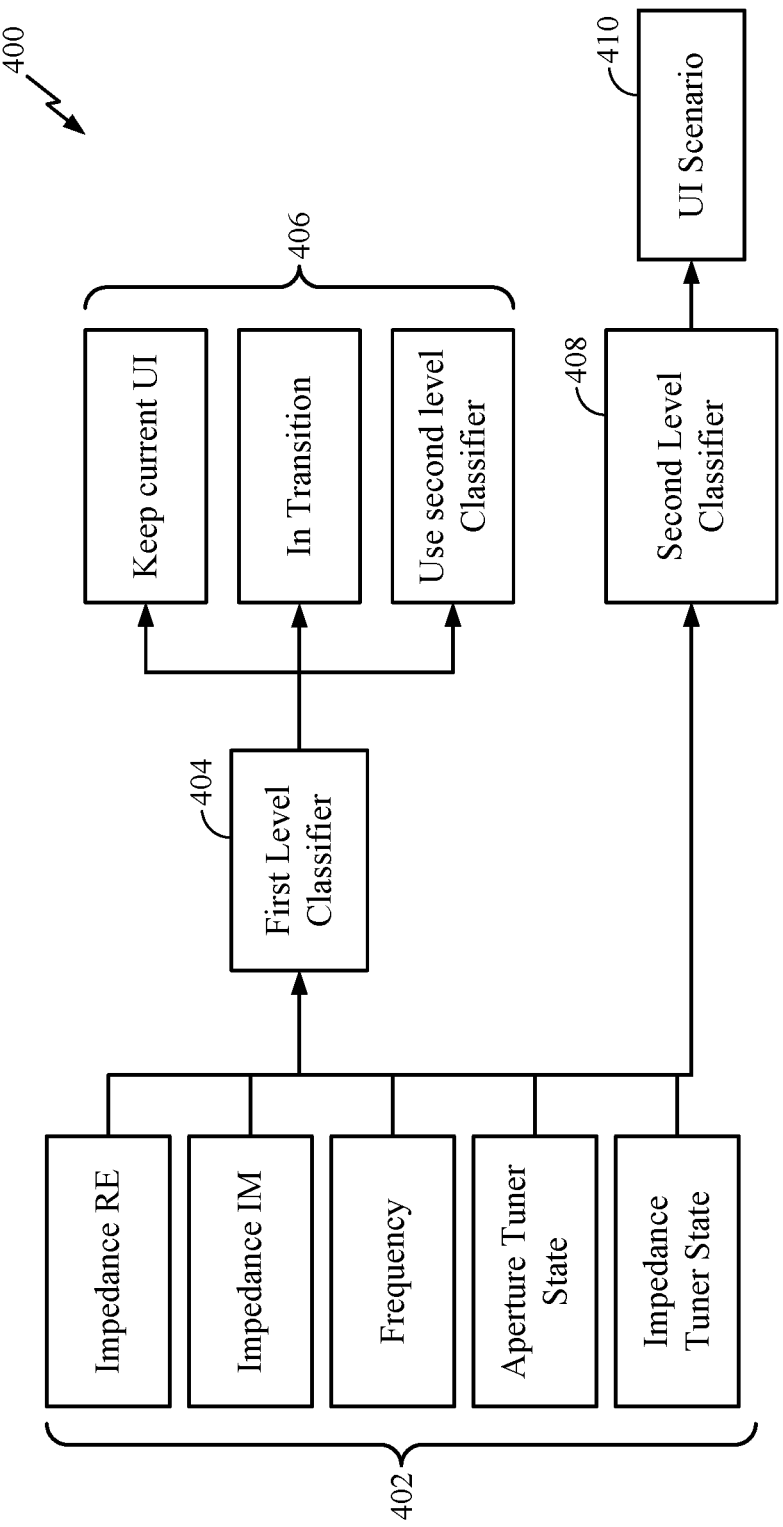
FIG. 4 depicts an example of a use case determination model.

FIG. 4 depicts an example of a use case determination model 400 architecture. Use case determination model 400 may be an example of the use case determination model 214 in FIG. 2 or 304 in FIG. 3.

Use case determination model 400 includes two classifiers 404 and 406, which may be referred to as first level or first stage and second level or second stage classifiers. In particular, first level classifier 404 may be a trained machine learning model, such as a neural network model, that takes as inputs one or more of: a real impedance measurement, an imaginary impedance measurement, a frequency, an aperture tuner state, and an impedance tuner state. Notably, in other aspects, first level classifier may take as inputs a subset of those depicted in FIG. 4, or additional inputs that are not shown. FIG. 4 is just one possible aspect.

Based on the inputs 402, first level classifier 404 may output one of a plurality of determinations 406. For example, first level classifier 404 may determine that a wireless electronic device should keep its current use case, which means that the aperture tuner settings and impedance tuner settings may be left in their current states and the second level classifier may be bypassed.

For example, in one aspect, first level classifier 404 compares the previous data points and the current data points, and determines a difference. If the difference is smaller than a difference threshold, then the wireless electronic device keeps its current use case. On the other hand, if the difference is larger than a difference threshold, then first level classifier 404 may determine that the wireless electronic device is "in transition". Once the difference goes back below the difference threshold (i.e., after a determination that the wireless electronic device is in transition), then second level classifier 408 may be used to determine a new use case for the wireless electronic device.

Thus, first level classifier 404 acts as a bypass filter for second level classifier 408. Bypassing the second level classifier saves processing resources. Testing has shown that in some cases as few as 1.4% of data points require second level classification.

As another example, first level classifier 404 may determine that the wireless electronic device is in a transitional state and consequently it should not yet change its antenna tuning. For example, data point 308B in FIG. 3 may represent a transitional state between the free space use case indicated by decision boundary 306A and the left-handed use case indicated by decision boundary 306C.

As another example, first level classifier 404 may determine that the use case of wireless electronic device has changed and therefore that second level classifier 408 should be used to determine that new use case. In such a case, second level classifier may take the same input inputs 402 (or some subset thereof) and determine a new use case 410 for the wireless electronic device. The new use case may be used by an adaptive antenna tuning component, such as component 216 in FIG. 2, in order to change the tuning of one or more antennas to improve the overall performance of the wireless data transmission system of an electronic device.

Notably, FIG. 4 is just one example of a use case determination model configuration, and other model types and configurations can be used. For example, in alternative aspects, a single-level classifier could be used to determine a use case directly without the filtering stage. Further, different inputs or mixes of inputs could be used and different outputs of the first level classifier are possible.

Use case determination models like FIG. 4 may be trained for different types (e.g., different models or configurations) of wireless electronic devices. In some aspects, the base use case determination model may be loaded into a wireless electronic device and then specific parameters for a specific wireless electronic device may be loaded onto the wireless electronic device via, for example, a configuration file. For example, the configuration file may include a matrix or matrices of parameters for one or more classifiers, such as first level classifier 404 and second level classifier 408 of FIG. 4.

Deployment of machine leaning-based use case determination models may significantly improve correct use case identification. For example, testing has shown a 95% use case determination accuracy for the systems and methods described herein compared to 67% for conventional systems and methods.

Example Use Case Determination and Adaptive Antenna Tuning Flow

Figure 5:
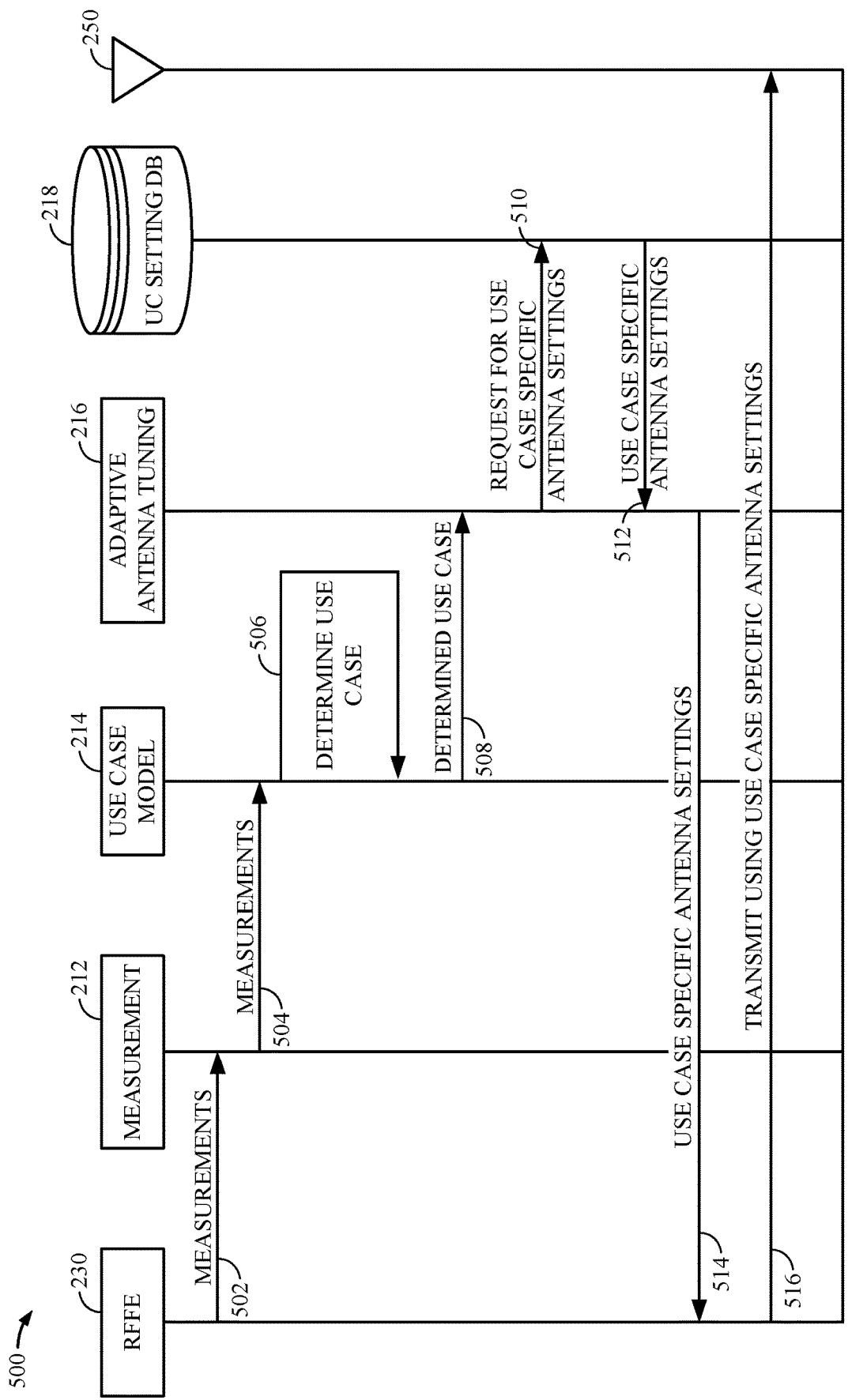
FIG. 5 depicts an example flow diagram for performing use case determination and adaptive antenna tuning.

FIG. 5 depicts an example flow diagram 500 for performing use case determination and adaptive antenna tuning.

Flow 500 starts at 502 where a radio frequency front end, such as 230 in FIG. 2, takes measurements related to one or more antennas' performance in a wireless electronic device and forwards them to a measurement component, such as measurement component 212 in FIG. 2. In some aspects, the measurements may be related to one or more of: an imaginary impedance, a real impedance, and/or a frequency of an element in a transmit chain, such as an antenna.

In other aspects, the measurements may be performed by elements of a transceiver, such as discussed above with respect to feedback receiver 222 in FIG. 2.

Measurement component 212 then forwards the measurements at step 504 to a use case determination model, such as use case determination model 214 in FIG. 2 or 400 in FIG. 4.

Use case determination model 214 then uses the measurements as input and determines a use case for the wireless electronic device at step 506. Note that as in FIG. 4, the determination by use case determination model 214 may be to not change the use case of the wireless electronic device. In such cases, the determined use case may be the current use case.

When use case determination model 214 determines a new use case at step 506, i.e., one different than the current use case of the wireless electronic device, it then forwards the determined use case to an adaptive antenna tuner at step 508, such as adaptive antenna tuning component 216 in FIG. 2.

Adaptive antenna tuning component 216 then requests use case-specific antenna tuning settings based on the determined use case from a use case setting database (e.g., a look-up table or relational database) at step 510. The use case setting database 218 returns the use case-specific antenna settings at step 512. The use case-specific antenna settings may comprise, for example, impedance tuner settings and/or aperture tuner settings, such as for impedance tuner 232 and aperture tuner 234 of FIG. 2.

Adaptive antenna tuning component 216 then forwards the use case specific antenna settings to radio frequency front end 230 for implementation at step 514.

Radio frequency front end 230 then implements the use case specific antenna settings and transmits data using the use case specific antenna settings at step 516. In some aspects, implementing the use case specific antenna settings may involve impedance and/or aperture tuning multiple antennas.

Notably, FIG. 5 is just one example of a flow, and different flows are possible. For example, in other aspects, aspects of flow 500 may be performed by putting various data on a shared data bus rather than directly transmitting it from one element of a wireless electronic device to another element of the wireless electronic device.

Example Method of Generating a Use Case Determination Model

Figure 6:
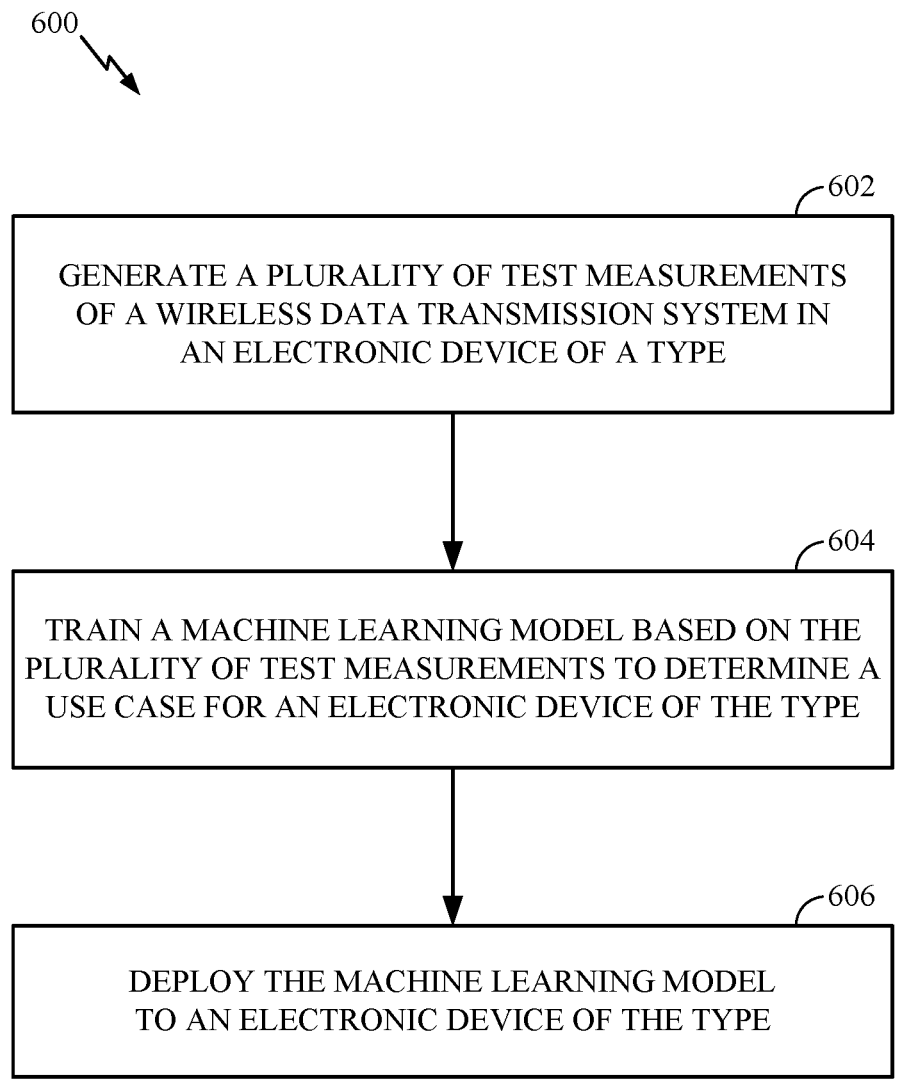
FIG. 6 depicts an example method of generating a wireless electronic device use case determination model and deploying it to a wireless electronic device.

FIG. 6 depicts an example method 600 of generating a wireless electronic device use case determination model and deploying it to a wireless electronic device.

Method 600 begins at step 602 with generating a plurality of test measurements of a wireless data transmission system in a first type of electronic device. In some aspects, each test measurement of the plurality of test measurements is associated with a predefined use case of the first type of electronic device.

In some aspects, the plurality of test measurements comprise one or more of: a real impedance of an element of the wireless data transmission system; an imaginary impedance of the element of the wireless data transmission system; a frequency of the wireless data transmission system; an impedance tuner state; and/or an aperture tuner state. In some aspects, the element is an antenna of the wireless data transmission system.

Method 600 then proceeds to step 604 with training a machine learning model based on the plurality of test measurements to determine a use case for the first type of electronic device based on a plurality of live or operational data values of the first type electronic device. For example, the operational data values may be live measurements associated with the wireless data transmission system of the electronic device. Further, the type of electronic device may be, for example, a specific model of electronic device, or a specific family of electronic devices that share the same or similar wireless data transmission systems or components thereof.

In some aspects, the machine learning model is a neural network model.

In some aspects, training the machine learning model further comprises training a first classifier of the machine learning model to determine whether the first type of electronic device is no longer in a first use case, and training a second classifier of the machine learning model to determine a second use case for the first type of electronic device, such as described above with respect to FIG. 4.

Method 600 then proceeds to step 606 with deploying the machine learning model to an electronic device of the first type. The electronic device to which the machine learning model is deployed may be the same device for which test measurements were made, a different device of the same specific model, or a different device of the same specific family of electronic devices that share the same or similar wireless data transmission systems (or components thereof) to the device for which test measurements were made.

In some aspects, method 600 further comprises generating a plurality of synthetic measurements based on the plurality of test measurements, and training the machine learning model based on the plurality of synthetic measurements.

In some aspects, method 600 further comprises determining a plurality of closed decision boundaries based on the trained machine learning model, wherein each decision boundary of the plurality of decision boundaries is associated with a predefined use case of the first type of electronic device, such as described above with respect to FIG. 3.

Example Method of Performing Adaptive Antenna Tuning

Figure 7:
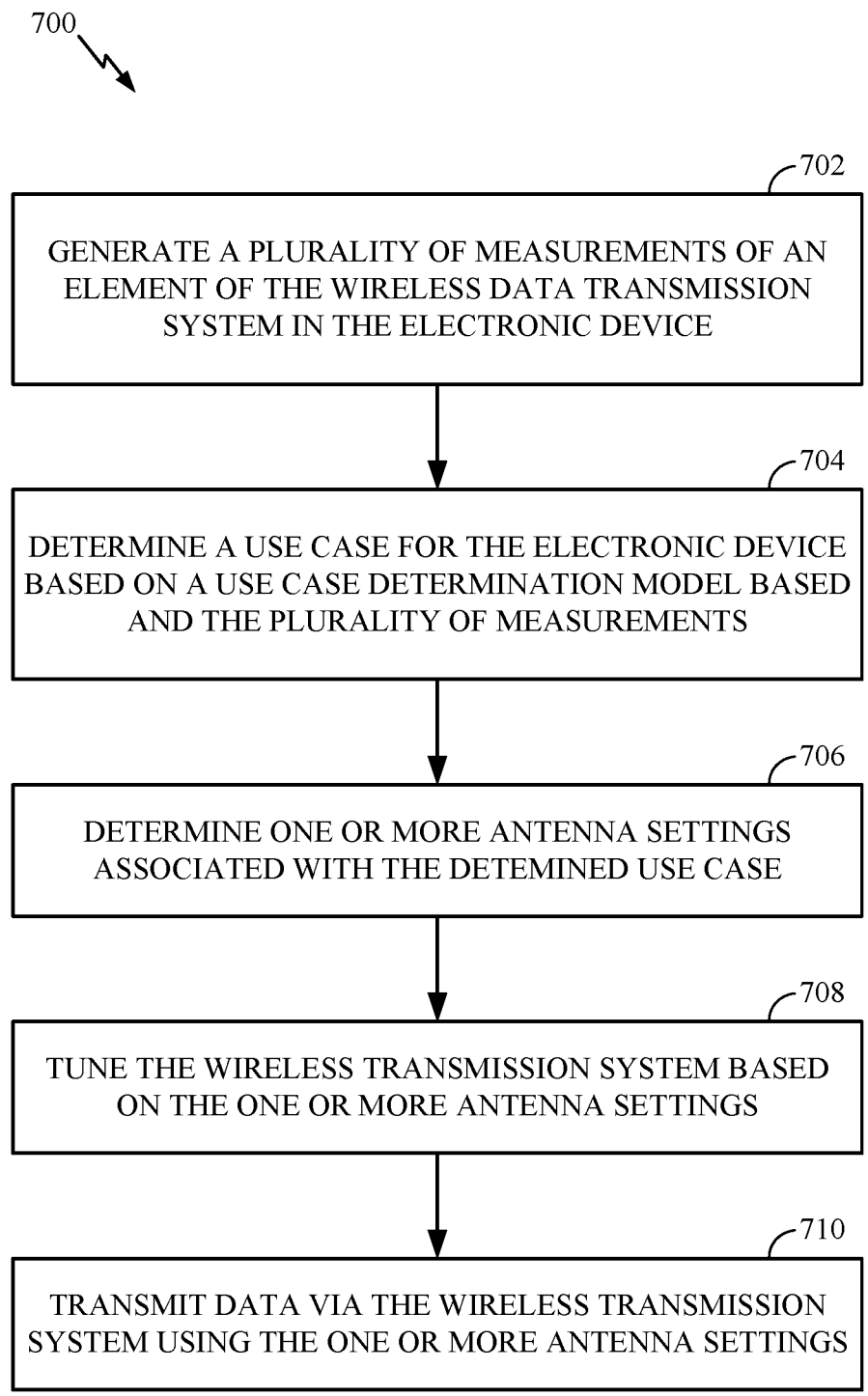
FIG. 7 depicts an example method of performing adaptive antenna tuning based on a use case determination model.

FIG. 7 depicts an example method 700 of performing adaptive antenna tuning based on a use case determination model.

Method 700 begins at step 702 with generating a plurality of measurements of an element of the wireless data transmission system in the electronic device.

In some aspects, the plurality of measurements comprise one or more of: a real impedance of the element of the wireless data transmission system, an imaginary impedance of the element of the wireless data transmission system, a frequency of the wireless data transmission system, an impedance tuner state, and an aperture tuner state.

Method 700 then proceeds to step 704 with determining a use case for the electronic device based on a use case determination model based and the plurality of measurements.

In some aspects, the use case determination model is a neural network model. In some aspects, the use case determination model comprises: a first classifier configured to determine whether the electronic device is no longer in a first use case; and a second classifier configured to determine a second use case for the electronic device, such as described above with respect to FIG. 4. In some aspects the use case determination model is stored in a memory of a modem of the electronic device.

In some aspects, determining the use case for the electronic device comprises comparing the measurements to a plurality of closed decision boundaries, wherein each decision boundary of the plurality of decision boundaries is associated with a predefined use case of the electronic device, such as described above with respect to FIG. 3.

Method 700 then proceeds to step 706 with determining one or more antenna settings associated with the determined use case.

In some aspects, the one or more antenna settings associated with the determined use case comprise one or more of: an impedance tuner setting; or an aperture tuner setting.

In some aspects, determining the one or more antenna settings associated with the determined use case comprises: querying a use case setting database; and receiving the one or more antenna settings associated with the determined use case from the use case setting database, such as described above with respect to FIG. 5.

Method 700 then proceeds to step 708 with tuning the wireless transmission system based on the one or more antenna settings.

In some aspects, tuning the wireless transmission system based on the one or more antenna settings comprises providing the aperture tuner setting to an aperture tuner of the electronic device.

In some aspects, tuning the wireless transmission system based on the one or more antenna settings further comprises providing the impedance tuner setting to an impedance tuner of the electronic device.

Method 700 then proceeds to step 710 with transmitting data via the wireless transmission system using the one or more antenna settings.

Figure 8:
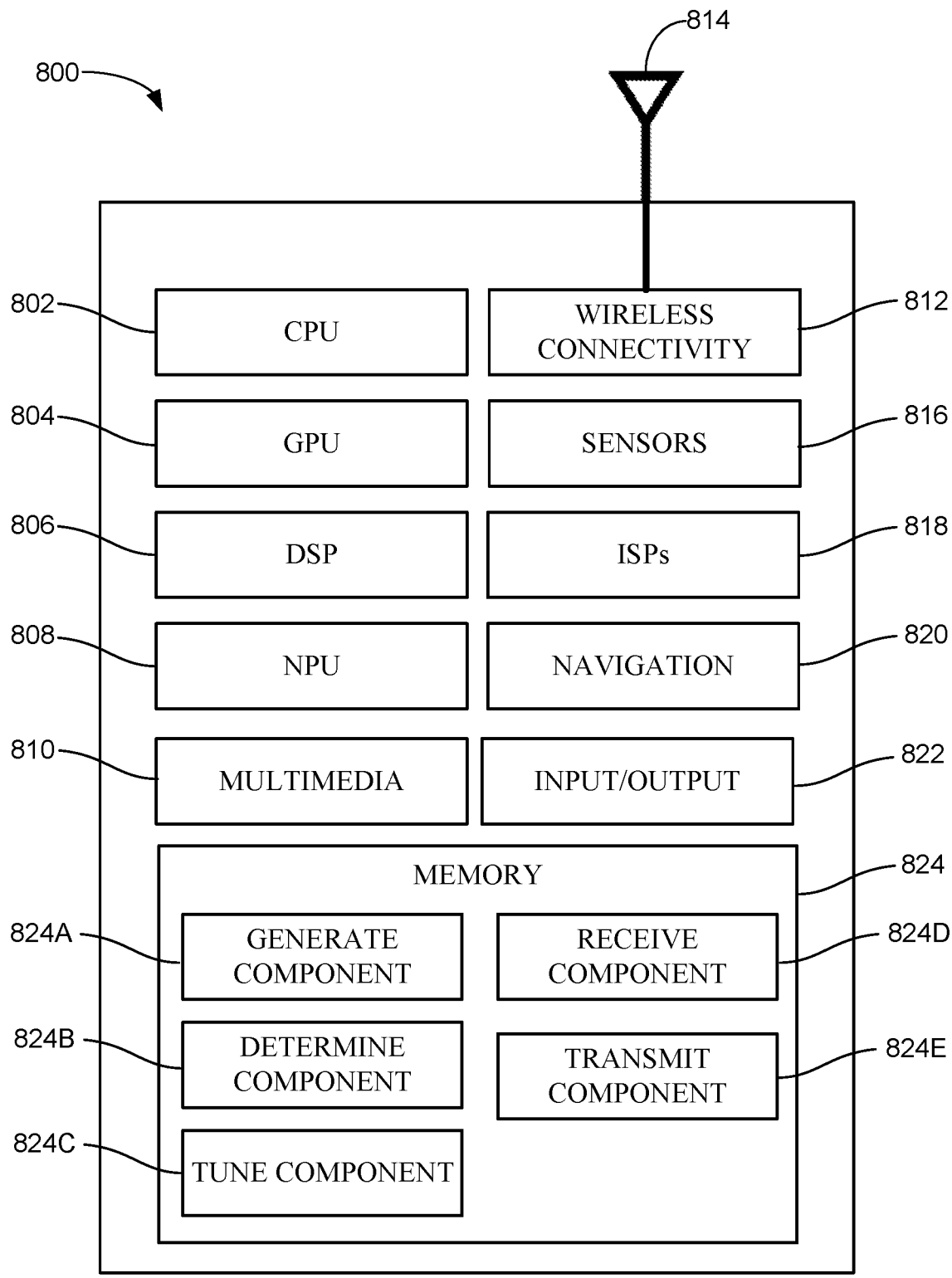
FIG. 8 illustrates an example electronic device that may be configured to perform the method of adaptive antenna tuning based on a use case determination model.

FIG. 8 illustrates an example electronic device 800. Electronic device 800 may be configured to perform the methods described herein, including with respect to FIGS. 5-7.

Electronic device 700 includes a central processing unit (CPU) 802, which in some embodiments may be a multi-core CPU. Instructions executed at the CPU 802 may be loaded, for example, from a program memory associated with the CPU 802 or may be loaded from a memory block 824.

Electronic device 800 also includes additional processing blocks tailored to specific functions, such as a graphics processing unit (GPU) 804, a digital signal processor (DSP) 806, a neural processing unit (NPU) 808, a multimedia processing block 810, a multimedia processing unit 810, and a wireless connectivity block 812.

In one implementation, NPU 808 is implemented in one or more of CPU 802, GPU 804, and/or DSP 806.

In some embodiments, wireless connectivity block 712 may include components, for example, for third generation (3G) connectivity, fourth generation (4G) connectivity (e.g., 4G LTE), fifth generation connectivity (e.g., 5G or NR), Wi-Fi connectivity, Bluetooth connectivity, and other connectivities according to other wireless data transmission standards. Wireless connectivity processing block 812 is further connected to one or more antennas 814.

Electronic device 800 may also include one or more sensors processors 816 associated with any manner of sensor, one or more image signal processors (ISPs) 816 associated with any manner of image sensor, and/or a navigation processor 820, which may include satellite-based positioning system components (e.g., GPS or GLONASS) as well as inertial positioning system components.

Electronic device 800 may also include one or more input and/or output devices 822, such as screens, touch-sensitive surfaces (including touch-sensitive displays), physical buttons, speakers, microphones, and the like.

In some embodiments, one or more of the processors of electronic device 800 may be based on an ARM instruction set.

Electronic device 800 also includes memory 824, which is representative of one or more static and/or dynamic memories, such as a dynamic random access memory, a flash-based static memory, and the like. In this example, memory 824 includes computer-executable components, which may be executed by one or more of the aforementioned processors of electronic device 800. In particular, in this embodiment, memory 824 includes generate component 824A, determine component 824B, tune component 824C, receive component 824D, and transmit component 824E.

Generally, electronic device 800 or components thereof may be configured to perform the methods described herein.

Alternative Aspects

Alternative aspects are set out in the following numbered clauses.

Clause 1: A method of generating an electronic device use case determination model for an electronic device, comprising: generating a plurality of test measurements of a wireless data transmission system in a first type of electronic device, wherein each test measurement of the plurality of test measurements is associated with a predefined use case of the first type of electronic device; and training a machine learning model based on the plurality of test measurements to determine a use case for the first type of electronic device based on a plurality of operational values of the first type of electronic device.

Clause 2: The method of Clause 1, wherein the machine learning model is a neural network model.

Clause 3: The method of any one of Clauses 1 or 2, wherein the plurality of test measurements comprise: a real impedance of an element of the wireless data transmission system; an imaginary impedance of the element of the wireless data transmission system; a frequency of the wireless data transmission system; and one or more of: an impedance tuner state; or an aperture tuner state.

Clause 4: The method of Clause 3, wherein the element is an antenna of the wireless data transmission system.

Clause 5: The method of any one of Clauses 1-4, further comprising: generating a plurality of synthetic measurements based on the plurality of test measurements; and training the machine learning model based on the plurality of synthetic measurements.

Clause 6: The method of any one of Clauses 1-5, wherein training the machine learning model further comprises: training a first classifier of the machine learning model to determine whether the first type of electronic device is no longer in a first use case; and training a second classifier of the machine learning model to determine a second use case for the first type of electronic device.

Clause 7: The method of any one of Clauses 1-6, further comprising: determining a plurality of closed decision boundaries based on the trained machine learning model, wherein each closed decision boundary of the plurality of closed decision boundaries is associated with a predefined use case of the first type of electronic device.

Clause 8: The method of any one of Clauses 1-7, further comprising: deploying the machine learning model to an electronic device of the first type.

Clause 9: A training system, comprising: a memory comprising computer-executable instructions; a processor configured to execute the computer-executable instructions and cause the training system to: generate a plurality of test measurements of a wireless data transmission system in a first type of electronic device, wherein each test measurement of the plurality of test measurements is associated with a predefined use case of the first type of electronic device; and train a machine learning model based on the plurality of test measurements to determine a use case for the first type of electronic device based on a plurality of operational values of the first type of electronic device.

Clause 10: The training system of Clause 9, wherein the machine learning model is a neural network model.

Clause 11: The training system of any one of Clauses 9-10, wherein the plurality of test measurements comprise: a real impedance of an element of the wireless data transmission system; an imaginary impedance of the element of the wireless data transmission system; a frequency of the wireless data transmission system; and one or more of: an impedance tuner state; or an aperture tuner state.

Clause 12: The training system of Clause 11, wherein the element is an antenna of the wireless data transmission system.

Clause 13: The training system of any one of Clauses 9-12, further comprising: generating a plurality of synthetic measurements based on the plurality of test measurements; and training the machine learning model based on the plurality of synthetic measurements.

Clause 14: The training system of any one of Clauses 9-13, wherein in order to train the machine learning model, the processor is further configured to cause the training system to: train a first classifier of the machine learning model to determine whether the first type of electronic device is no longer in a first use case; and train a second classifier of the machine learning model to determine a second use case for the first type of electronic device.

Clause 15: The training system of any one of Clauses 9-14, wherein: the processor is further configured to cause the training system to determine a plurality of closed decision boundaries based on the trained machine learning model, and each closed decision boundary of the plurality of closed decision boundaries is associated with a predefined use case of the first type of electronic device.

Clause 16: The training system of any one of Clauses 9-15, wherein the processor is further configured to cause the training system to: deploy the machine learning model to an electronic device of the first type.

Clause 17: a non-transitory computer-readable medium comprising computer executable instructions that, when executed by a processor of a processing system, cause the processing system to perform a method according to any one of Clauses 1-8.

Clause 18: A method for adaptively tuning a wireless data transmission system in an electronic device, comprising: generating a plurality of measurements of an element of the wireless data transmission system in the electronic device; determining a use case for the electronic device based on a use case determination model and the plurality of measurements; determining one or more antenna settings associated with the determined use case; tuning the wireless data transmission system based on the one or more antenna settings; and transmitting data via the wireless data transmission system using the one or more antenna settings.

Clause 19: The method of Clause 18, wherein: the use case determination model is a neural network model.

Clause 20: The method of any one of Clauses 18 or 19, wherein the use case determination model is stored in a memory of a modem of the electronic device.

Clause 21: The method of any one of Clauses 18-20, wherein the plurality of measurements comprise: a real impedance of the element of the wireless data transmission system; an imaginary impedance of the element of the wireless data transmission system; a frequency of the wireless data transmission system; and one or more of: an impedance tuner state; or an aperture tuner state.

Clause 22: The method of any one of Clauses 18-21, wherein the use case determination model comprises: a first classifier configured to determine whether the electronic device is no longer in a first use case; and a second classifier configured to determine a second use case for the electronic device.

Clause 23: The method of any one of Clauses 18-22, wherein determining the use case for the electronic device comprises: comparing the measurements to a plurality of closed decision boundaries, wherein each closed decision boundary of the plurality of closed decision boundaries is associated with a predefined use case of the electronic device.

Clause 24: The method of any one of Clauses 18-23, wherein the one or more antenna settings associated with the determined use case comprise one or more of: an impedance tuner setting; or an aperture tuner setting.

Clause 25: The method of any one of Clauses 18-24, wherein determining the one or more antenna settings associated with the determined use case comprises: querying a use case setting database; and receiving the one or more antenna settings associated with the determined use case from the use case setting database.

Clause 26: The method of any one of Clauses 18-25, wherein tuning the wireless data transmission system based on the one or more antenna settings comprises: providing an aperture tuner setting to an aperture tuner of the electronic device.

Clause 27: The method of any one of Clauses 18-26, wherein tuning the wireless data transmission system based on the one or more antenna settings further comprises: providing an impedance tuner setting to an impedance tuner of the electronic device.

Clause 28: An electronic device, comprising: a wireless data transmission system; a memory comprising computer-executable instructions; a processor configured to execute the computer-executable instructions and cause the electronic device to: generate a plurality of measurements of an element of the wireless data transmission system in the electronic device; determine a use case for the electronic device based on a use case determination model and the plurality of measurements; determine one or more antenna settings associated with the determined use case; tune the wireless data transmission system based on the one or more antenna settings; and transmit data via the wireless data transmission system using the one or more antenna settings.

Clause 29: The electronic device of Clause 28, wherein: the use case determination model is a neural network model.

Clause 30: The electronic device of any one of Clauses 28 or 29, wherein; the wireless data transmission system comprises a modem, the modem comprises the memory, and the use case determination model is stored in the memory of the modem.

Clause 31: The electronic device of any one of Clauses 28-30, wherein the plurality of measurements comprise: a real impedance of the element of the wireless data transmission system; an imaginary impedance of the element of the wireless data transmission system; a frequency of the wireless data transmission system; and one or more of: an impedance tuner state; or an aperture tuner state.

Clause 32: The electronic device of any one of Clauses 28-31, wherein the use case determination model comprises: a first classifier configured to determine whether the electronic device is no longer in a first use case; and a second classifier configured to determine a second use case for the electronic device.

Clause 33: The electronic device of any one of Clauses 28-32, wherein in order to determine the use case for the electronic device, the processor is further configured to cause the electronic device to: compare the measurements to a plurality of closed decision boundaries, wherein each closed decision boundary of the plurality of closed decision boundaries is associated with a predefined use case of the electronic device.

Clause 34: The electronic device of any one of Clauses 28-33, wherein the one or more antenna settings associated with the determined use case comprise one or more of: an impedance tuner setting; or an aperture tuner setting.

Clause 35: The electronic device of any one of Clauses 28-34, wherein in order to determine the one or more antenna settings associated with the determined use case, the processor is further configured to cause the electronic device to: query a use case setting database; and receive the one or more antenna settings associated with the determined use case from the use case setting database.

Clause 36: The electronic device of any one of Clauses 28-35, wherein in order to tune the wireless data transmission system based on the one or more antenna settings, the processor is further configured to cause the electronic device to: provide an aperture tuner setting to an aperture tuner of the electronic device.

Clause 37: The electronic device of any one of Clauses 28-36, wherein in order to tune the wireless data transmission system based on the one or more antenna settings, the processor is further configured to cause the electronic device to: provide an impedance tuner setting to an impedance tuner of the electronic device.

Clause 38: a non-transitory computer-readable medium comprising computer executable instructions that, when executed by a processor of a processing system, cause the processing system to perform a method according to any one of Clauses 18-27.

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of generating an electronic device use case determination model for an electronic device, comprising:
   generating a plurality of test measurements of a wireless data transmission system in a first type of electronic device, wherein each test measurement of the plurality of test measurements is associated with a predefined use case of the first type of electronic device; and
   training a machine learning model based on the plurality of test measurements to determine a use case for the first type of electronic device based on a plurality of operational values of the first type of electronic device.

2. The method of claim 1, wherein the machine learning model is a neural network model.

3. The method of claim 2, wherein the plurality of test measurements comprise:
   a real impedance of an element of the wireless data transmission system;
   an imaginary impedance of the element of the wireless data transmission system;
   a frequency of the wireless data transmission system; and one or more of:
      an impedance tuner state; or
      an aperture tuner state.

4. The method of claim 3, wherein the element is an antenna of the wireless data transmission system.

5. The method of claim 1, further comprising:
   generating a plurality of synthetic measurements based on the plurality of test measurements; and
   training the machine learning model based on the plurality of synthetic measurements.

6. The method of claim 1, wherein training the machine learning model further comprises:
   training a first classifier of the machine learning model to determine whether the first type of electronic device is no longer in a first use case; and
   training a second classifier of the machine learning model to determine a second use case for the first type of electronic device.

7. The method of claim 1, further comprising:
   determining a plurality of closed decision boundaries based on the trained machine learning model,
   wherein each closed decision boundary of the plurality of closed decision boundaries is associated with a predefined use case of the first type of electronic device.

8. The method of claim 1, further comprising: deploying the machine learning model to an electronic device of the first type.

9. A training system, comprising:
   a memory comprising computer-executable instructions;
   a processor configured to execute the computer-executable instructions and cause the training system to:
      generate a plurality of test measurements of a wireless data transmission system in a first type of electronic device, wherein each test measurement of the plurality of test measurements is associated with a predefined use case of the first type of electronic device; and
      train a machine learning model based on the plurality of test measurements to determine a use case for the first type of electronic device based on a plurality of operational values of the first type of electronic device,
      wherein the machine learning model is a neural network model.

10. The training system of claim 9, wherein the plurality of test measurements comprise:
    a real impedance of an element of the wireless data transmission system;
    an imaginary impedance of the element of the wireless data transmission system;
    a frequency of the wireless data transmission system; and one or more of:
       an impedance tuner state; or
       an aperture tuner state.

11. The training system of claim 10, wherein the element is an antenna of the wireless data transmission system.

12. The training system of claim 9, further comprising:
    generating a plurality of synthetic measurements based on the plurality of test measurements; and training the machine learning model based on the plurality of synthetic measurements.

13. The training system of claim 9, wherein in order to train the machine learning model, the processor is further configured to cause the training system to:
    train a first classifier of the machine learning model to determine whether the first type of electronic device is no longer in a first use case; and
    train a second classifier of the machine learning model to determine a second use case for the first type of electronic device.

14. The training system of claim 9, wherein:
    the processor is further configured to cause the training system to determine a plurality of closed decision boundaries based on the trained machine learning model, and
    each closed decision boundary of the plurality of closed decision boundaries is associated with a predefined use case of the first type of electronic device.

15. The training system of claim 9, wherein the processor is further configured to cause the training system to: deploy the machine learning model to an electronic device of the first type.

16. A method for adaptively tuning a wireless data transmission system in an electronic device, comprising:
    generating a plurality of measurements of an element of the wireless data transmission system in the electronic device;
    determining a use case for the electronic device based on a use case determination model and the plurality of measurements;
    determining one or more antenna settings associated with the determined use case;
    tuning the wireless data transmission system based on the one or more antenna settings; and
    transmitting data via the wireless data transmission system using the one or more antenna settings.

17. The method of claim 16, wherein: the use case determination model is a neural network model.

18. The method of claim 17, wherein the use case determination model is stored in a memory of a modem of the electronic device.

19. The method of claim 16, wherein the plurality of measurements comprise:
    a real impedance of the element of the wireless data transmission system;
    an imaginary impedance of the element of the wireless data transmission system;
    a frequency of the wireless data transmission system; and one or more of:
        an impedance tuner state; or
        an aperture tuner state.

20. The method of claim 16, wherein the use case determination model comprises:
    a first classifier configured to determine whether the electronic device is no longer in a first use case; and
    a second classifier configured to determine a second use case for the electronic device.

21. The method of claim 16, wherein determining the use case for the electronic device comprises:
    comparing the measurements to a plurality of closed decision boundaries,
    wherein each closed decision boundary of the plurality of closed decision boundaries is associated with a predefined use case of the electronic device.

22. The method of claim 16, wherein the one or more antenna settings associated with the determined use case comprise one or more of:
    an impedance tuner setting; or
    an aperture tuner setting.

23. The method of claim 16, wherein determining the one or more antenna settings associated with the determined use case comprises:
    querying a use case setting database; and
    receiving the one or more antenna settings associated with the determined use case from the use case setting database.

24. The method of claim 16, wherein tuning the wireless data transmission system based on the one or more antenna settings comprises: providing an aperture tuner setting to an aperture tuner of the electronic device.

25. The method of claim 16, wherein tuning the wireless data transmission system based on the one or more antenna settings further comprises: providing an impedance tuner setting to an impedance tuner of the electronic device.

26. An electronic device, comprising:
    a wireless data transmission system;
    a memory comprising computer-executable instructions;
    a processor configured to execute the computer-executable instructions and cause the electronic device to:
        generate a plurality of measurements of an element of the wireless data transmission system in the electronic device;
        determine a use case for the electronic device based on a use case determination model and the plurality of measurements;
        determine one or more antenna settings associated with the determined use case;
        tune the wireless data transmission system based on the one or more antenna settings; and
        transmit data via the wireless data transmission system using the one or more antenna settings.

27. The electronic device of claim 26, wherein: the use case determination model is a neural network model.

28. The electronic device of claim 27, wherein;
    the wireless data transmission system comprises a modem,
    the modem comprises the memory, and
    the use case determination model is stored in the memory of the modem.

29. The electronic device of claim 26, wherein the plurality of measurements comprise:
    a real impedance of the element of the wireless data transmission system;
    an imaginary impedance of the element of the wireless data transmission system;
    a frequency of the wireless data transmission system; and one or more of:
        an impedance tuner state; or
        an aperture tuner state.

30. The electronic device of claim 26, wherein the use case determination model comprises:
    a first classifier configured to determine whether the electronic device is no longer in a first use case; and
    a second classifier configured to determine a second use case for the electronic device.

31. The electronic device of claim 26, wherein in order to determine the use case for the electronic device, the processor is further configured to cause the electronic device to:
    compare the measurements to a plurality of closed decision boundaries, wherein each closed decision boundary of the plurality of closed decision boundaries is associated with a predefined use case of the electronic device.

32. The electronic device of claim 26, wherein the one or more antenna settings associated with the determined use case comprise one or more of:
an impedance tuner setting; or
an aperture tuner setting.

33. The electronic device of claim 26, wherein in order to determine the one or more antenna settings associated with the determined use case, the processor is further configured to cause the electronic device to:
query a use case setting database; and
receive the one or more antenna settings associated with the determined use case from the use case setting database.

34. The electronic device of claim 26, wherein in order to tune the wireless data transmission system based on the one or more antenna settings, the processor is further configured to cause the electronic device to: provide an aperture tuner setting to an aperture tuner of the electronic device.

35. The electronic device of claim 26, wherein in order to tune the wireless data transmission system based on the one or more antenna settings, the processor is further configured to cause the electronic device to: provide an impedance tuner setting to an impedance tuner of the electronic device.

* * * * *